Patented June 4, 1929.

1,716,028

UNITED STATES PATENT OFFICE.

FRANK A. CANON, OF CRAFTON, PENNSYLVANIA, ASSIGNOR TO THE SELDEN COMPANY, OF PITTSBURGH, PENNSYLVANIA, A CORPORATION OF DELAWARE.

EFFLUENT-GAS TREATMENT.

No Drawing.    Application filed February 15, 1929. Serial No. 340,347.

This invention relates to the treatment of effluent gases from catalytic oxidations, such as, the oxidation of naphthalene to phthalic anhydride, acenaphthene to naphthalic anhydride, etc. The invention may also be applied to the effluent gases from the sublimation of similar organic compounds.

When naphthalene is oxidized to phthalic anhydride a number of by-products are obtained, such as maleic acid, benzoic acid, and the like. Normally the phthalic anhydride is condensed from the converter exhaust gases and in the most modern and efficient processes it is condensed fractionally. The effluent gases leaving the condenser contain small amounts of phthalic anhydride together with varying amounts of benzoic acid, maleic acid, and the like. Of course there is always present a large amount of carbon dioxide which is produced in the reaction. These fumes or effluents can not be permitted to escape into the atmosphere as they contain empyreumatic constituents and maleic acid is also irritating to the eyes. It has been necessary to scrub the gases which is ordinarily done in a so-called fume tower where the gases are subjected to a spray of water. The spray removes the acids and absorbs some of the undesirable constituents, but in order to effect a satisfactory scrubbing large amounts of water have to be used which not only entails a considerable cost, but also produces too dilute a solution of the acids to be commercially usable so that a considerable amount of valuable products are lost.

It has been proposed to use an alkali spray which very effectively removes the acids in satisfactory concentration and is a very efficient process but entails a considerable cost for soluble alkali and also requires a rather elaborate spray equipment which must be frequently cleaned. The present invention retains all of the advantages of the soluble alkali spray and at the same time produces results at a lower cost and with much more simple equipment. According to the present invention the ordinary fume tower which is usually of wood construction is filled with fairly coarse fragments of limestone, dolomite or other insoluble carbonates. Sufficient water is introduced at the top of the tower to trickle over the limestone fragments and the effluent gases are passed up through the tower flowing over the limestone. The carbon dioxide which is present in high concentration in the effluent gases brings about the solution of small amounts of the limestone in the water in the form of the bicarbonate. This immediately reacts with the acid vapors as does some of the undissolved limestone itself and the calcium salts of the acids are formed which in the case of benzoic, phthalic and maleic acids are soluble and dissolve in the water stream trickling down over the limestone fragments. The acids are recovered in the form of fairly concentrated solutions of their salts and most of the acids can be separated easily owing to the different solubility of their calcium and magnesium salts. The amount of water used of course is a minimum as the fragments over which it trickles present an enormous surface to the gases and an exceedingly efficient scrubbing is obtained. Fresh limestone of course is periodically filled into the top of the tower.

Instead of using limestone, dolomite may be used where there is no objection to obtaining a mixture of the calcium and magnesium salts of the acids but where it is desired to obtain the phthalic acid in the form of the calcium salt, as for example, when it is to be used for transformation into benzoic acid, limestone should be used.

The effluent gases from condensers in which sublimed phthalic anhydride has been condensed may be treated in the same manner and of course with the same effectiveness. The invention can also be applied to the effluent gases from other organic oxidations or from sublimations where acid impurities are present.

Not only does the process of the present invention scrub the effluent gases very effectively, but in the case of effluent gases from phthalic anhydride plants, the resulting scrubbing liquor can be easily worked up since the calcium maleates and benzoates are less soluble than calcium phthalate, and may be separated by setting, decantation, or any other suitable method.

What is claimed as new is:

1. A method of scrubbing effluent gases from vapor phase organic reactions which comprises passing the gases over water insoluble carbonates in the presence of water.

2. A method of scrubbing the effluent gases from vapor phase organic processes which comprises passing the gases over water insoluble carbonates in countercurrent to a stream of water.

3. A method of scrubbing the effluent gases from the oxidation or sublimation of aromatic compounds which comprises passing the gases over water insoluble carbonates in contact with water.

4. A method of scrubbing the effluent gases from the vapor phase production or purification of phthalic anhydride which comprises passing the effluent gases over water insoluble carbonates in contact with water.

5. A method of scrubbing the effluent gases from the vapor phase production or purification of phthalic anhydride which comprises passing the effluent gases over water insoluble carbonates in countercurrent to a stream of water.

6. A method according to claim 5 in which the carbonates are limestone.

7. A method according to claim 4 in which the carbonates are limestone.

8. A method according to claim 1 in which the water insoluble carbonate used is capable of forming water soluble acid carbonates.

Signed at Pittsburgh, Pennsylvania, this 12th day of February, 1929.

FRANK A. CANON.